United States Patent
Diemer

(10) Patent No.: US 6,451,405 B1
(45) Date of Patent: Sep. 17, 2002

(54) OIL TARP ASSEMBLY FOR HEAVY MACHINERY

(76) Inventor: John Craig Diemer, 4515 County Rd. 25, Jemison, AL (US) 35085

( * ) Notice: Subject to any disclaimer, the term of this patent is extended or adjusted under 35 U.S.C. 154(b) by 0 days.

(21) Appl. No.: 09/391,930

(22) Filed: Sep. 8, 1999

(51) Int. Cl.⁷ .............................. B32B 3/06; B32B 3/10
(52) U.S. Cl. ........................... 428/100; 428/99; 296/38; 220/573; 184/106
(58) Field of Search ...................... 428/99, 100, 131; 296/38; 184/106; 220/573; 137/312

(56) References Cited

U.S. PATENT DOCUMENTS

| | | | |
|---|---|---|---|
| 2,497,565 A | 2/1950 | Stark | |
| 3,228,491 A | 1/1966 | Gatsos | |
| 3,722,626 A | 3/1973 | Stack | |
| 4,497,147 A | 2/1985 | Clapper et al. | |
| 4,684,562 A | 8/1987 | Hartkemeyer | |
| 4,748,063 A | * 5/1988 | Reuben | ........................ 428/99 |
| 4,798,754 A | 1/1989 | Tomek | |
| 4,801,005 A | 1/1989 | Hahn et al. | |
| 4,904,514 A | * 2/1990 | Morrison et al. | ............. 428/99 |
| 5,080,956 A | 1/1992 | Smith | |
| 5,270,089 A | 12/1993 | Alston et al. | |
| 5,500,267 A | 3/1996 | Canning | |
| 5,506,040 A | 4/1996 | Cordani | |

* cited by examiner

Primary Examiner—Alexander S. Thomas

(57) ABSTRACT

An improved oil drip mat assembly for use with heavy machinery having a cab and a center pin supporting the cab, such as a crane or derrick. The oil drip mat assembly includes a mat that is preferably rectangular in shape. The mat includes a central aperture and a slit positioned between the central aperture and the periphery of the mat. The slit defines a pair of edges that are flexible to be positioned around the center pin. The central aperture of the mat is therefore designed so that the edges of the slit may be adjusted so that the periphery of the central aperture can be placed around the center pin. The oil drip mat assembly also includes a plurality of eyelets surrounding the periphery of the mat and a connecting means to couple the mat to the cab such that the mat can be positioned under the cab of the machine and remain under the cab during operation of the machine to retain dispensed materials.

14 Claims, 5 Drawing Sheets

OIL TARP ASSEMBLY FOR HEAVY MACHINERY

FIELD OF THE INVENTION

The present invention relates generally to a mat for protecting a ground surface from waste discharged by heavy machinery. More particularly, the invention pertains to an oil drip mat assembly for use in conjunction with heavy machinery for collecting oil discharged from the machinery.

BACKGROUND OF THE INVENTION

The use of heavy machinery in plants and work sites presents many problems for the surrounding environment. One problem commonly occurring during the operation of heavy machinery is the undesired leakage of liquids, such as oil, from the machinery during use. Liquids falling from the machinery can have negative results, such as pollution of the environment or creation of a hazardous area for workers in the region surrounding the machinery where the liquid is discharged.

The problem of undesired leaks is especially evident with heavy, mobile machinery, such as cranes and derricks, which have a center pin that controls the rotation of the machine. Such machines often leak oil and other fluids during transit, which presents problems as described above. In attempting to control this problem of undesired discharges with heavy machinery, several designs have been implemented which endeavor to trap and contain the oil that is unintentionally released from the machine. For example, simple oil drip mats that are merely used to cover the ground surface surrounding the machinery have commonly been used to try to contain the leaked oil. These simple mats are merely rectangular pieces of material placed under and around the machinery in an attempt to catch or contain the discharged oil. However, with heavy, mobile machines, such as a crane or derrick, such elementary designs for collecting oil will not work efficiently. For example, using such a conventional drip mat with the machinery requires that the mat constantly be repositioned and replaced as the machine moves forward or as the cab of the machine rotates. Due to this constant repositioning of the mat, a large portion of the oil and other dripping materials may not be trapped and contained by the mat.

In addition to the simple design previously described, there are a plurality of mat designs for catching the undesired dripped oil described in U.S. patents. For example, in U.S. Pat. No. 2,497,565, issued to Stark, a grease mat for hydraulic hoists is illustrated. This mat is designed to be used with hydraulic hoists that include a rectangular platform. The mat is designed such that it includes a circular aperture and a slit so that the mat can surround the hydraulic hoist. However, the design further includes a series of clamps used to attach the mat to the floor so that the mat will remain secure and stationery at its desired location, and this design does not provide a means to attach to a machine to travel with that machine. Accordingly, this design will not travel during movement of the machinery, and therefore this design will not prevent the leaks occurring with the machinery during travel or during the rotation of the cab.

Another conventional grease mat design is shown in U.S. Pat. No. 3,228,491, issued to Gatsos, which illustrates a mat for catching grease and oil droppings beneath an automobile. Such a mat is spread on the floor of the garage, and feet attached to the mat are used to secure the mat to the floor. This mat, as with a plurality of similar designs, is intended to be spread across a ground area to cover the section to be protected. However, such mats are designed to be placed directly on the floor and are not designed to be used with mobile machinery. Consequently, as with the previous design, this design will not be able to travel with the machinery to collect oil as it leaks from the cab of the machine.

What is needed, then, and not found in the prior art, is an oil drip mat assembly designed for use with heavy machinery having a center pin such that the mat may surround the center pin of the machinery and be capable of traveling with the movement of the machine to collect discharged oil and similar materials.

SUMMARY OF THE INVENTION

An object of the present invention is to provide an improved oil drip mat assembly for use with heavy machinery having a center pin.

Another object of the present invention is to provide an improved oil drip mat assembly integrally attached to a center pin that will rotate with the center pin.

A further object of the present invention is to provide an improved oil drip mat assembly for use with a machine having a cab and a center pin that moves laterally in conjunction with the cab of the machine to capture oil and other materials falling from the machine.

The present invention describes an improved oil drip mat assembly for use with heavy machinery having a cab and a center pin supporting the cab, such as a crane or derrick. The oil drip mat assembly includes a mat that is preferably rectangular in shape. The mat includes a central aperture and a slit positioned between the periphery of the central aperture and the periphery of the mat. The slit defines a pair of edges that are flexible to be moved around the center pin. The central aperture of the mat is therefore designed so that the edges of the slit may be adjusted so that the periphery of the central aperture can be placed around the center pin. Furthermore, the oil drip mat assembly includes a plurality of eyelets connected to the periphery of the mat. A rope or similar connecting means is used to couple the eyelets of the mat to the cab itself such that the mat can be positioned under the cab of the machine and remain under the cab during operation of the machine. Therefore, as the cab rotates with the center pin, or as the machine travels along a linear path, the oil drip mat assembly will remain positioned directly beneath the cab to catch and absorb any materials disposed of by the cab.

BRIEF DESCRIPTION OF THE DRAWINGS

An oil drip mat assembly embodying the features of the present invention is depicted in the accompanying drawings which form a portion of this disclosure and wherein.

DESCRIPTION OF THE PREFERRED EMBODIMENTS

Figure 1:
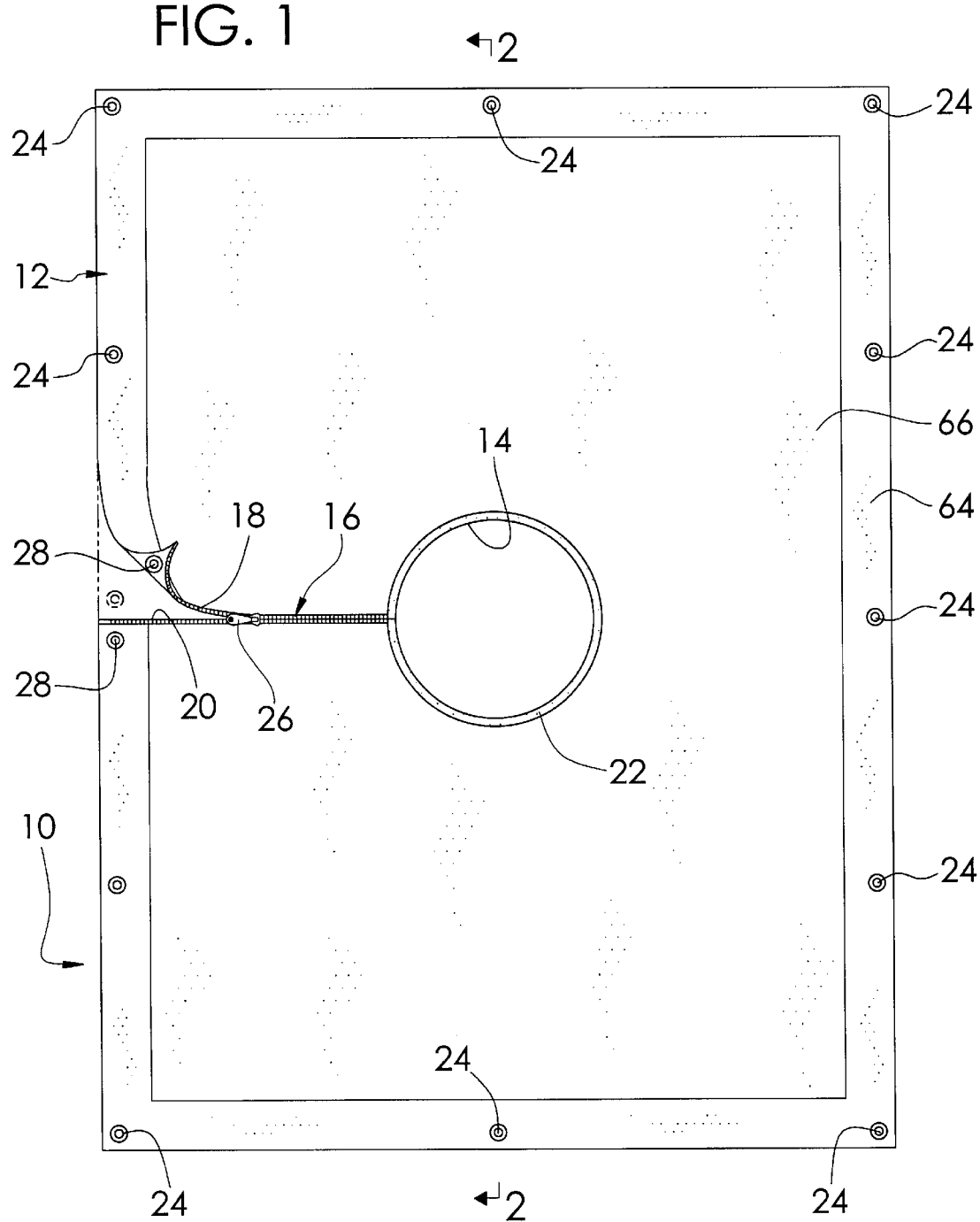
FIG. 1 is a top plan view of a first embodiment of the oil drip mat assembly of the present invention.

Referring to FIG. 1, a plan view of the oil drip mat assembly 10 to be used with heavy machinery is shown. The oil drip mat assembly 10 includes a mat 12, an aperture 14 that is preferably centrally located within the mat 12, a slit 16 that extends from the periphery of the central aperture 14 to the periphery of the mat 12, and a mat attachment means including a plurality of eyelets 24 attached along the periphery of the mat 12 for use in connecting the mat 12 to a machine such as a crane 50 (as shown in FIG. 3).

Figure 2:
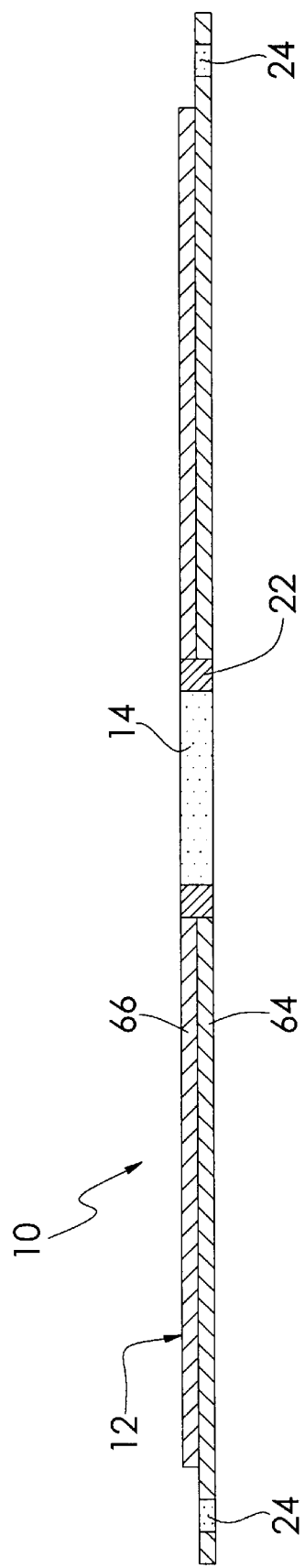
FIG. 2 is a sectional side view of the mat of the oil drip mat assembly of FIG. 1 taken along the lines 2—2.
Figure 4:
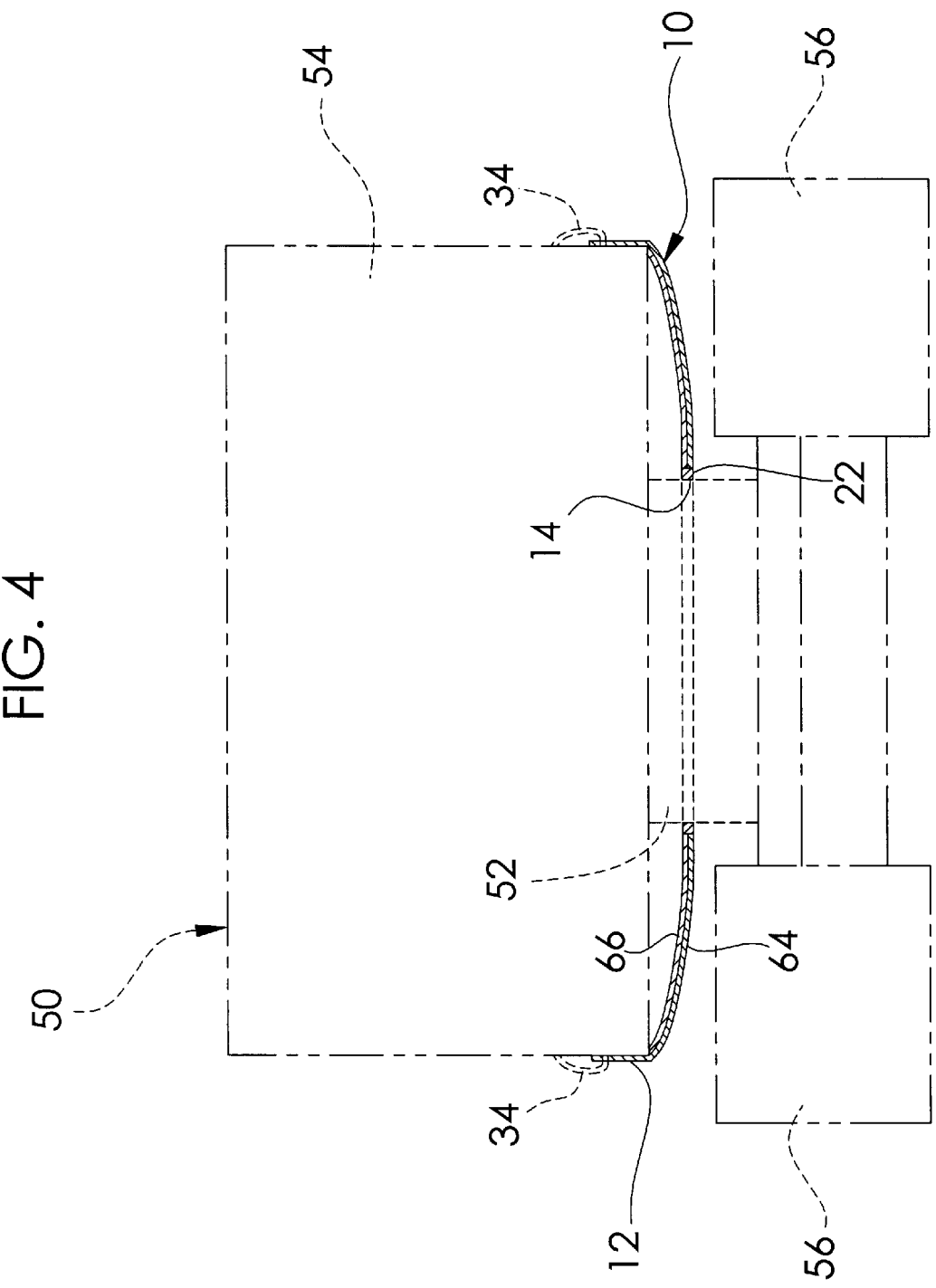
FIG. 4 is a sectional view of the oil drip mat assembly used in conjunction with the crane having a center pin as shown in FIG. 3, the view taken along the lines 4—4.

A sectional view of the mat 12, as shown in FIG. 2, further illustrates the mat 12 having various layers of protective materials. The mat 12 includes a liquid repellent or barrier layer 64 that is preferably made of vinyl or a similar water resistant material. Attached to the liquid repellent layer 64 is a liquid absorbent layer 66 that is made of an oil absorption material. When attached to a crane 50 (as illustrated in FIG. 4), the liquid absorbent layer 66 is positioned between the liquid repellent layer 64 and the cab 54 of the crane 50. The liquid repellent layer 64 therefore blocks the undesired materials from passing through the mat 12, and the liquid absorbent layer 66 is capable of absorbing the liquids retained by the liquid repellent layer of the mat 12.

Figure 3:
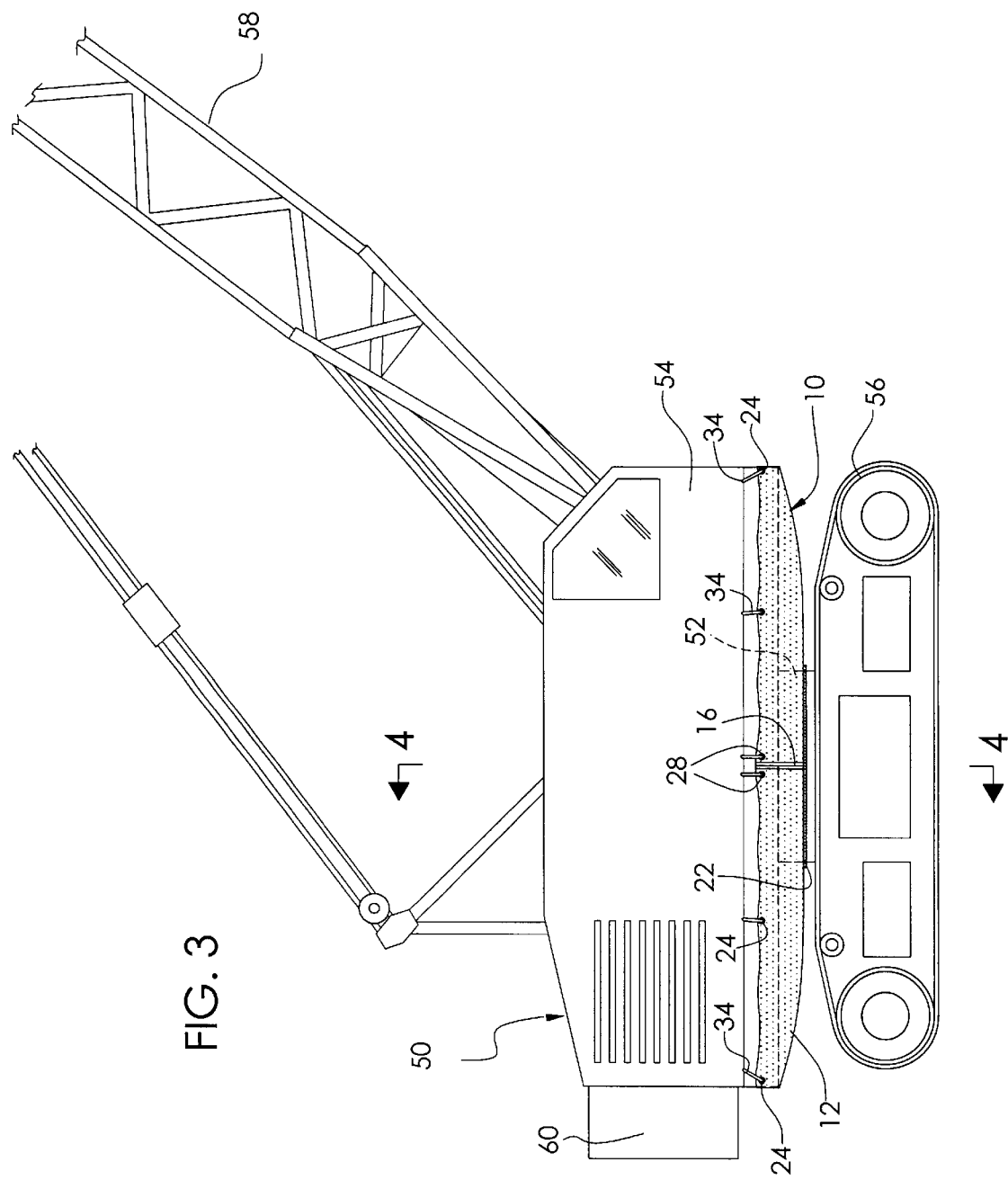
FIG. 3 is a perspective view of the oil drip mat assembly used with a conventional crane having a center pin.

Looking further at FIGS. 3 and 4, the oil drip mat assembly 10 is shown connected to a standard crawler crane 50. As stated above, the crane 50 includes a cab 54 that is positioned on a center pin 52, and the crane 50 additionally includes a pair of tracks 56 that support both the center pin 52 and the cab 54. Additionally, the crane 50 includes a boom 58 attached to the cab 54, and a counterweight 60 attached to cab 54 on the side opposite of the boom 58 to offset the weight of the boom 58 and any cargo that is being lifted by the boom 58. The crane 50 is designed such that the motor (not shown) and other lubricated parts are contained inside of the cab 54. The motor controls the rotation of the cab 54 around the center pin 52, and the motor also controls the lateral movement of the tracks 56 of the crane 50. Consequently, it is important that the mat 12 be able to travel under the motor to catch any liquids expelled from the motor.

Since the cab 54 contains the motor and the other machine parts that may drip oil, the mat 12 is designed to hang below the cab 54 to catch any oil leaked from the motor. In order for the mat 12 to hang below the cab 54, the periphery of the central aperture 14 is circular so that the periphery of the central aperture 14 of the mat 12 will surround the center pin 52 of the crane 50. The diameter of each center pin 52 conventionally ranges from three feet to eleven feet; and since the diameter of the central aperture 14 is substantially equivalent to the diameter of the center pin 52, the diameter of the central aperture 14 is typically between three feet and eleven feet as well.

Referring back to FIG. 1, the slit 16 between the central aperture 14 and the periphery of the mat 12 defines first and second slit edges 18, 20. The first and second slit edges 18, 20 are flexible to be maneuvered around the center pin 52 such that the central aperture 14 may surround the center pin 52, and the mat 12 can be placed under the cab 54 to catch the oil discharged from the motor. Additionally, an elastic ring 22 is attached to the periphery of the central aperture 14 to surround the center pin 52 and therefore provide a tight connection between the periphery of the central aperture 14 and the center pin 52.

The first and second slit edges 18, 20 are typically connected to each other once the mat 12 is placed around the center pin 52. This connection between the first and second slit edges 18, 20 secures the connection between the mat 12 and the center pin 52, and also assures that the mat 12 will catch the oil dripping from the motor and contain the oil to prevent the oil from seeping through any loose points in the mat 12. To connect the first and second slit edges 18, 20 to each other, a fastening means 26 is coupled to each slit edge 18, 20. The preferred embodiment of the fastening means 26 is a conventional zipper or some other similar means that is able to provide a resolute connection between the first and second slit edges 18, 20. The fastening means 26 must make a complete connection between the first and second slit edges 18, 20 such that only an inconsiderable amount of oil may leak through the mat 12. In addition, a fastening eyelet 28 is placed on the periphery of the mat 12 a close distance from each slit edge 18, 20 so that a rope or similar object may further reinforce the connection between the first and second slit edges 18, 20.

Figure 5:
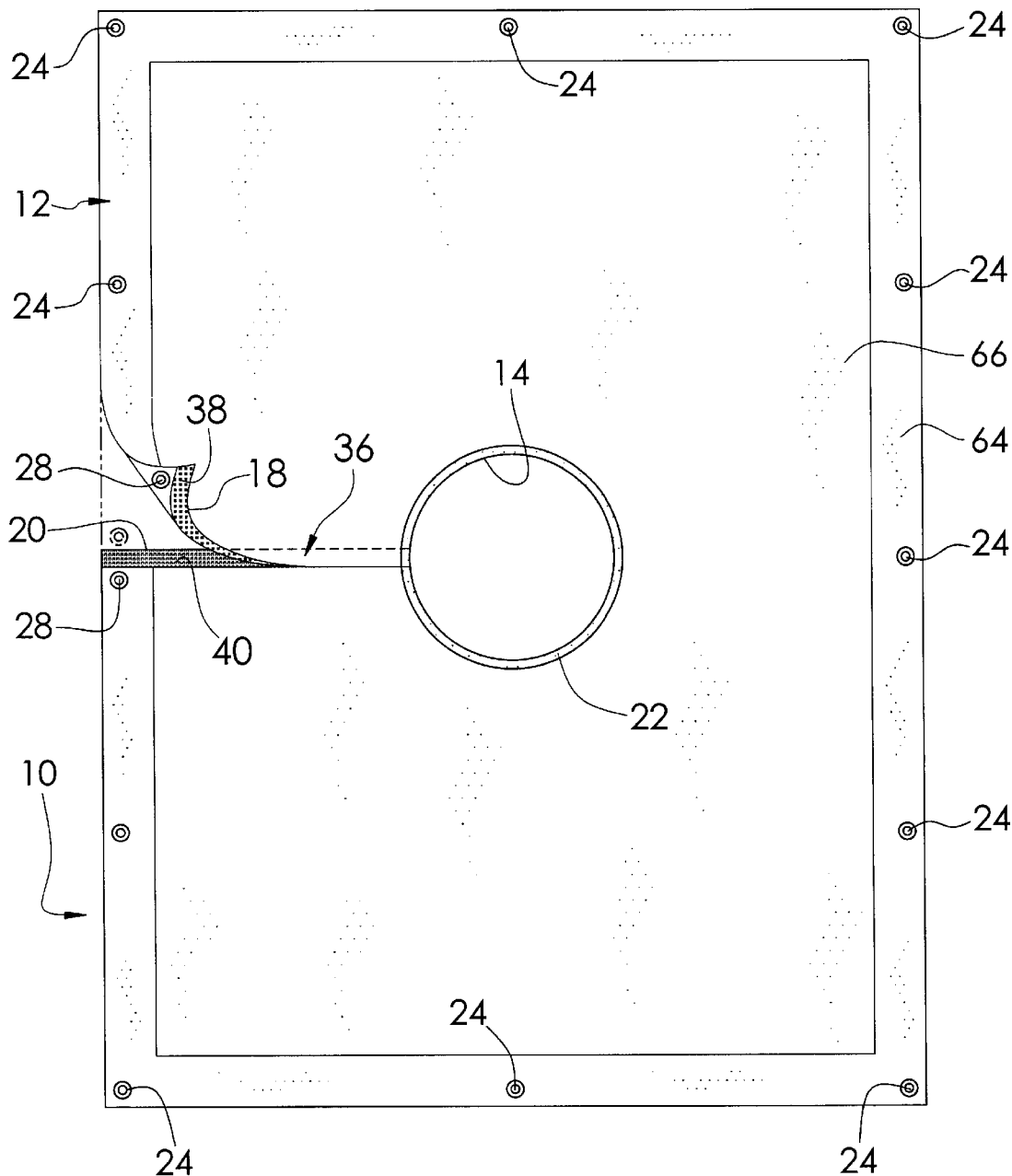
FIG. 5 is a top plan view of a second embodiment of the oil drip mat assembly of the present invention implementing a hook and loop material as a fastening means.

A second embodiment of the invention illustrated in FIG. 5, may also include a hook and loop material attached to the mat 12. In such an embodiment, the area of the mat 12 adjacent to the first slit edge 18 is extended to form a flap 36 that extends beyond the second slit edge 20. A first strip 38 of hook and loop material is attached to the flap 36 on the side facing the second slit edge 20, and a second strip 40 of hook and loop material is attached to the mat 12 in the area adjacent the second slit edge 18 facing the flap 36. Therefore, the first strip 38 of hook and loop material attached to the flap 36 may engage the second strip 40 of hook and loop material to form a connection that will minimize the amount of oil that may be leaked through the mat 12. Additionally, the flap 36 of this embodiment may be positioned by the second slit edge 20 as opposed to the first slit edge 18 and operate as described above to close the slit 16 between the first slit edge 18 and the second slit edge 20.

The mat 12 itself is preferably rectangular in shape (as shown in FIG. 1), although other shapes may be used according to the machinery to which the mat 12 is being attached. The dimensions of the mat 12 depend on the size of the cab 54 that the mat 12 is to be positioned under. The mat 12 is conventionally designed to be eight feet long and six feet wide, but these dimensions can be changed as necessary. The eyelets 24 of the present invention are arranged along the periphery of the mat 12. These eyelets 24 are integrally attached in the mat 12 so that the mat 12 may be connected to the cab 54 or another object of the crane 50 using the eyelets 24 and a connecting means 34. The eyelets 24 are spaced along the periphery of the mat 12 to allow the connecting means 34, such as a rope or an elastic cord, to be inserted through the eyelets 24 and connected to the cab 54. This connection therefore reinforces the attachment of the mat 12 with the crane 50, and verifies that the mat 12 will extend under the cab 54 to collect any oil or other objects discharged from the cab 54.

Although the oil drip mat assembly 10 is illustrated in use with a crawler crane 50 in FIGS. 3 and 4, the oil drip mat assembly 10 may be used with any heavy machinery having a center pin 52 or similar shaft. Examples of such other machinery include drill rigs and other types of cranes besides the crawler shown in FIG. 2, such as a jig crane or a derrick crane.

Thus, although there have been described particular embodiments of the present invention of a new and useful OIL DRIP MAT ASSEMBLY FOR HEAVY MACHINERY, it is not intended that such references be construed as limitations upon the scope of this invention except as set forth in the following claims.

What is claimed is:

1. An apparatus for capturing materials discharged from a machine having a center pin and a cab attached to the center pin, the apparatus comprising:

a mat operable to surround the center pin, said mat including:
- an aperture within said mat, said aperture operable to surround the center pin; and
- a slit between the periphery of said mat and the periphery of said aperture, said slit creating a first slit edge and a second slit edge;

mat attachment means operable to connect said mat with said cab;

a plurality of eyelets attached to the periphery of said mat; and connecting means operable to connect said eyelets with said cab.

2. The apparatus of claim 1, wherein said connecting means includes a rope.

3. The apparatus of claim 1 wherein said mat comprises a liquid repellent layer and a liquid absorbent layer attached to said liquid repellent layer.

4. The apparatus of claim 1 further comprising a fastening means connected to said first slit edge and said second slit edge, said fastening means operable to releasably connect said first slit edge with said second slit edge.

5. The apparatus of claim 4 wherein said fastening means comprises a zipper.

6. The apparatus of claim 4 wherein said fastening means includes a first and second fastening eyelet attached to the periphery of said mat equidistant from said slit, and a fastening rope operable to connect said first eyelet with said second eyelet.

7. The apparatus of claim 4 wherein said fastening means comprises a hook and loop material.

8. The apparatus of claim 1 further comprising an elastic ring connected to the periphery of said aperture to form a seal about between said mat and said center pin.

9. An apparatus for collecting and retaining fluid expelled from machinery supported on a shaft, comprising:
- a substantially flattened material having an aperture for receiving the shaft transversely therethrough and a slit connecting said aperture to the periphery of said material such that the shaft is received within said aperture through said slit, wherein said aperture has a diameter substantially equivalent to a diameter of the shaft such that the periphery of said aperture abuts the periphery of the shaft when the shaft is positioned within said aperture;
- closing means for releasably closing said slit; and
- attaching means for attaching the periphery of said material to the machinery such that any fluid which is expelled from the machinery is collected by said material between the periphery of said material and the periphery of said aperture;
- wherein said attaching means includes a plurality of eyelets surrounding the periphery of said material and a connecting means operable to couple said eyelets to the machinery.

10. The apparatus according to claim 9, wherein said material comprises an absorbent layer for absorbing any expelled fluid and a barrier layer subjacent said absorbent layer for preventing the fluid from escaping said material.

11. The apparatus according to claim 9, wherein said closing means comprises a zipper.

12. The apparatus according to claim 9, wherein said closing means comprises a hook and loop fastener.

13. The apparatus according to claim 9, wherein said connecting means includes a rope.

14. The apparatus according to claim 9 further comprising an elastic ring connected to the periphery of said aperture.

* * * * *